US007768507B2

(12) United States Patent
Fry

(10) Patent No.: US 7,768,507 B2
(45) Date of Patent: Aug. 3, 2010

(54) METHODS AND APPARATUS FOR DRIVING A DISPLAY DEVICE

(75) Inventor: James B. Fry, Aurora (CA)

(73) Assignee: ATI Technologies ULC, Markham, Ontario (CA)

( * ) Notice: Subject to any disclaimer, the term of this patent is extended or adjusted under 35 U.S.C. 154(b) by 1116 days.

(21) Appl. No.: 11/164,308

(22) Filed: Nov. 17, 2005

(65) Prior Publication Data

US 2007/0109256 A1 May 17, 2007

(51) Int. Cl.
*G06F 3/038* (2006.01)

(52) U.S. Cl. .......................... 345/204; 341/58; 341/59; 710/313

(58) Field of Classification Search ................. 345/204; 710/313; 341/58, 59
See application file for complete search history.

(56) References Cited

U.S. PATENT DOCUMENTS 5,144,304 A 9/1992 McMahon et al.
5,625,644 A * 4/1997 Myers ........................ 375/242
5,974,464 A * 10/1999 Shin et al. ................... 709/231
6,232,895 B1 5/2001 Djupsjobacka et al.
6,870,930 B1 * 3/2005 Kim et al. ..................... 380/42
6,914,637 B1 * 7/2005 Wolf et al. .................. 348/473
7,132,823 B2 * 11/2006 Ng et al. .................. 324/158.1
7,152,136 B1 * 12/2006 Charagulla .................. 710/315
7,187,307 B1 * 3/2007 Schmidt et al. ............... 341/50
2002/0186321 A1 * 12/2002 Mair et al. .................. 348/469
2002/0186322 A1 * 12/2002 Mair et al. .................. 348/484
2003/0043141 A1 3/2003 Bae et al.
2003/0048851 A1 * 3/2003 Hwang et al. .......... 375/240.26
2003/0048852 A1 3/2003 Hwang et al.
2003/0210248 A1 * 11/2003 Wyatt ......................... 345/541
2003/0237041 A1 * 12/2003 Cole et al. .................. 714/776
2004/0039954 A1 * 2/2004 White et al. ................ 713/322
2004/0103333 A1 * 5/2004 Martwick et al. ........... 713/400
2004/0221315 A1 * 11/2004 Kobayashi .................. 725/126
2005/0228928 A1 * 10/2005 Diamond .................... 710/305
2007/0098112 A1 * 5/2007 Kim et al. ................... 375/312
2007/0115290 A1 * 5/2007 Polzin et al. ................ 345/501

OTHER PUBLICATIONS

International Search Report dated Oct. 10, 2007 for PCT Application No. PCT/IB2006/003317 pp. 1-12.

* cited by examiner

*Primary Examiner*—Amare Mengistu
*Assistant Examiner*—Koosha Sharifi
(74) *Attorney, Agent, or Firm*—Vedder Price P.C.

(57) ABSTRACT

According to the present disclosure, a transmitter for transmitting control characters to a display device over an interface includes a transmitter portion configured to transmit a control character having a plurality of bit values to the display device. The transmitter also includes logic configured to determine values of the bits in the control character and construct a corresponding plurality of rebalancing control characters based on the determination of the values of the plurality of bits in the control character to have bit values selected such that the combination of the control character and rebalancing control character is DC balanced. As such, the transmitter provides DC balance correction to non-DC balanced control characters in such a way as to allow DVI and HDMI to operate properly on an AC-coupled connection.

20 Claims, 3 Drawing Sheets

METHODS AND APPARATUS FOR DRIVING A DISPLAY DEVICE

TECHNICAL FIELD

The present application relates to methods and apparatus for driving a display and, in particular, methods and apparatus for transmitting control characters to a display device over an AC-coupled interface.

BACKGROUND

In computer systems having integrated graphics processing circuitry located within a bridge device, such as a northbridge, display media, such as monitors or displays are sometimes driven directly from the bridge. For particular display devices operating according to the digital video interface (DVI) standard or high definition multi-media interface (HDMI) devices, which are digital standards, there are situations where it may be desirable to drive such display devices using a PCI express slot on the northbridge or any other suitable bus and memory bridge circuit. In particular, it may be desirable to directly drive HDMI and DVI display devices using the physical layer (PHY) of the PCI express interface in order to avoid the need for a dedicated physical layer (PHY) for DVI or HDMI displays, which would add area and a resultant cost to a northbridge chip. Directly driving HDMI and DVI display devices using the PCI express physical layer also would avoid the need for an external DVI or HDMI in coder chip. Additionally, if an HDMI or DVI display device is driven using the PCI express physical layer, there are several design considerations warranting that the interface be AC-coupled. However, the DVI and HDMI specifications, as currently defined, would dissuade driving a display device over an AC-coupled interface because a prohibitively large DC drift would result. This drift is due to two control characters using Transmission Minimized Differential Signaling (TMDS), which are issued, according to the DVI and HDMI specifications, during the horizontal and vertical blanking regions, these control characters not being DC balanced. It is noted that DC balancing results from the bits in the control character having either a greater or lesser number of ones than zeros. The effect of the lack of an equal number of one bits and zero bits is a DC imbalance on a differential interface, which may result in errors at the DVI or HDMI receiver, which is usually located within the display device.

DETAILED DESCRIPTION OF THE PRESENT EXAMPLES

Figure 1:
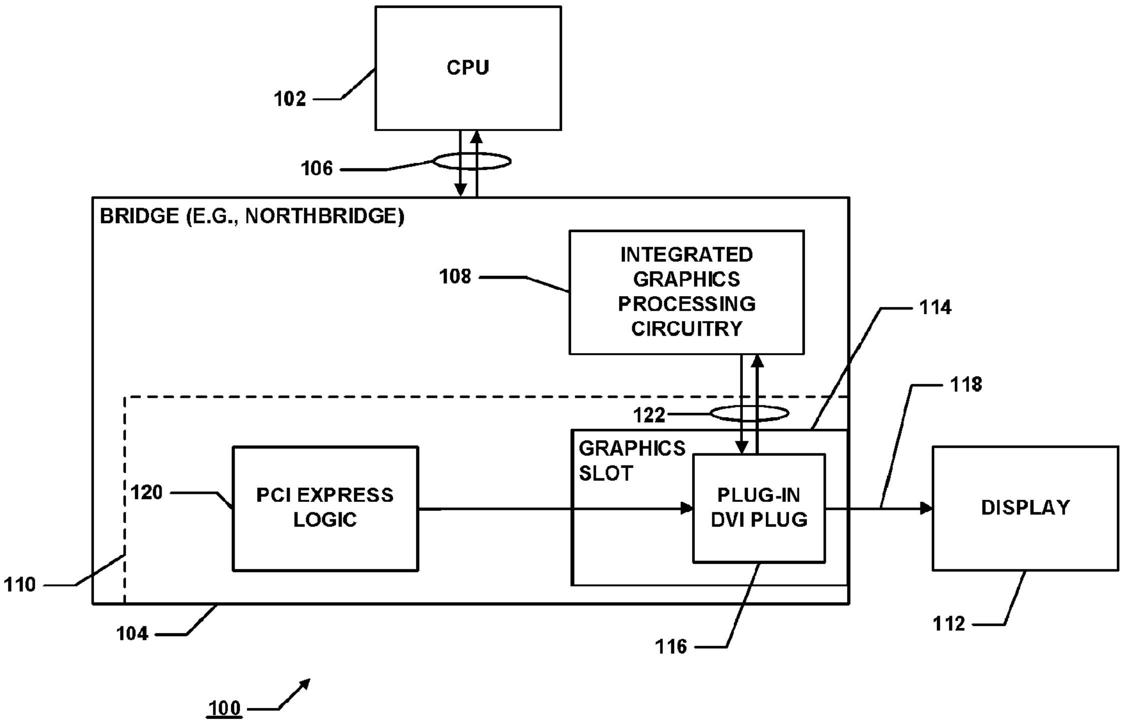
FIG. 1 illustrates an example of a computer system including a transmitter driving a display device from a slot on a bridge.

According to the present disclosure, a transmitter is disclosed for transmitting control characters to a display device over an interface includes a transmitter portion configured to transmit a control character having a plurality of bit values to the display device. The transmitter also includes logic configured to determine values of the bits in the control character and construct a corresponding plurality of rebalancing control characters based on the determination of the values of the plurality of bits in the control character to have bit values selected such that the combination of the control character and rebalancing control character is DC balanced. The bit sequence of the rebalancing control character is chosen such that it is recognized by the receiver as a control character, but is not mapped to any function in the receiver control logic, effectively causing the character to be ignored by this logic. Further, to effect a restoration of the DC balance of the serial bit stream, the rebalancing control characters are constructed such that the total number of "1" bits equals the total number of "0" bits over the aggregate of the control and rebalancing control characters. The transmitter may be incorporated in any suitable device or system including for example a laptop computer, wireless handheld device, server or any suitable device. Likewise a corresponding receiver that effectively ignores the rebalancing control character may be included in the same device or may be in another external device.

Additionally, a method is presently disclosed for transmitting control characters for driving a display device over an interface, such as a PCI Express interface. The method includes transmitting at least one control character to the display device. Further, the method includes determining the values of the bits in the at least one control character and then transmitting at least one rebalancing control character with the at least one control character, the rebalancing control character constructed based on the determination of the values of the bits in the at least one control character such that the combination of the at least one control character and the at least one rebalancing control character have DC balance.

The disclosed methods and apparatus are efficacious for driving HDMI or DVI display devices directly from memory bridge circuitry, such as a bridge device, such as a Northbridge, using the physical layer (PHY) of a PCI Express interface (i.e., the PCI Express PHY). As mentioned previously, driving these types of display devices directly using the PCI Express PHY is desirable because a dedicated PHY in the bridge device for driving the HDMI or DVI display devices or, alternatively an external DVI/HDMI encoder chip, may be avoided, thus avoiding additional space and cost to a system. Moreover, in typical bridge devices, such as a Northbridge, the PCI Express PHY is already present, typically for supporting an external graphics processing unit.

Moreover, when driving HDMI or DVI display devices, it is beneficial for the PCI Express PHY to be AC coupled (i.e., analog) for numerous reasons. First, using an AC-coupled interface simplifies the analog design of the PCI Express PHY, which may need to be tolerant of the 3.3 Volts of some DVI and HDMI interfaces in order to drive DC coupled DVI or HDMI devices. For example, both HDMI and DVI have receiver end pull-ups to 3.3V, by specification. If the transmitter were DC-coupled and not 3.3V tolerant, then the transistors of the output buffers would be subject to damage over time. By making the interface AC coupled, the transmitter never sees the DC level at its output buffers. Additionally, it is desirable to have a desktop motherboard interchangeably support both the graphics expansion board (i.e., an external graphics processing unit) and a HDMI/DVI connector add-in board, which is a straight connection from the PCI Express connector slot to a HDMI/DVI connector.

Turning to the drawings, FIG. 1 illustrates an example of a computer system including a transmitter driving a display device from a slot on a bridge device. In particular, a computer system 100 includes a CPU 102 coupled to a bridge device 104, such as a Northbridge, via an interface 106. The CPU 102 provides graphics data to integrated graphics processing circuitry 108, which is integrated within the bridge device 104. Within the bridge circuit 104 is a transmitter 110 that is used to transmit data to a display 112. The transmitter 110— includes a transmitter portion including a graphics slot 114 and a plug-in DVI or HDMI plug 116 that couples with the graphic slot 114. The display device 112 is then coupled to the plug-in DVI plug 116 by an AC coupled to a receiver or interface 118, such as an interface operating according to the PCI Express interface standard, or any other suitable AC coupled interface so as to receive the transmitted data.

The transmitter 110 also includes logic 120, such as a PCI express logic used to afford transmission of control characters via the transmitter portion including the graphic slot 114 and the plug-in DVI plug 116. Logic 120 is specifically configured to determine values of bits within the control characters transmitted according to either HDMI or DVI standards from the integrated graphics processing circuitry 108 through the transmitter portion via an interface 122 and plug 116 to display 112 via interface 118. Logic 120 is then further configured to construct at least one dummy or rebalancing control character based on the determination of the values of the bits in the control character. The rebalancing control character, which is constructed to contain information not recognizable by the display 112 operating according to the HDMI or DVI standards, is constructed to include bit values that are selected in order to insure that the combination of the control character and the rebalancing control character are DC balanced. For example, the rebalancing control character is chosen such that the total number of 1's for the two characters and the total number of 0's for the two characters is the same to insure that an equal number of ones and 0s are transmitted, thereby achieving DC balancing. Also, one or more rebalancing control characters can be inserted into the stream in a suitable temporal vicinity (adjacent before or after or non-adjacent) of the characters that cause the imbalance.

Figure 2:
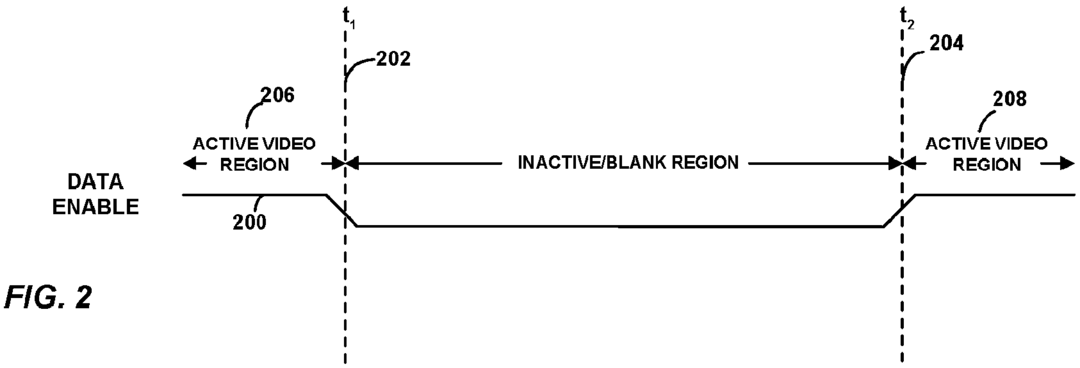
FIG. 2 illustrates a data enable signal issued by a transmitter driving a display device.
Figure 3:
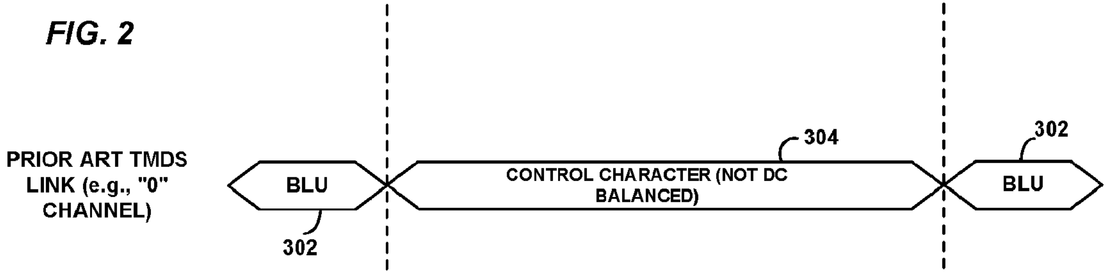
FIG. 3 illustrates an example of a DC unbalanced control character for a "0" channel transmission of a TMDS signal issued by a DVI or HDMI transmitter during the inactive time period of the data enable signal of FIG. 2 in accordance with the prior art.
Figure 4:
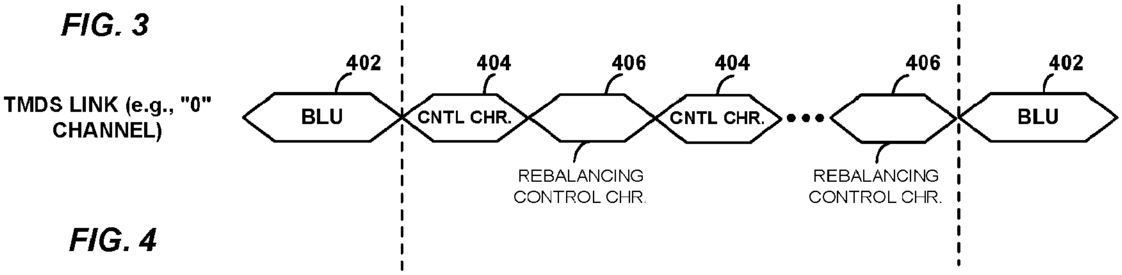
FIG. 4 illustrates an example of a DC balanced control character including rebalancing control characters transmitted during the inactive time period of the data enable signal of FIG. 2 in accordance with the present disclosure.

As an example of the signaling over the AC coupled interface 118, FIGS. 2-4 illustrate various data signal transmitted on the interface 118 as a reference to particular times t1 (202) and t2 (204). As illustrated in FIG. 2, the transmitter 110 sends a data enable signal 200. When the data enable 200 is high during an active video region 206 or 208, video data is transmitted such as "0" channel information (BLU) such as 302 and 402 illustrated in FIGS. 3 and 4. During an inactive/blank region, the data enable 200 is low allowing control characters to be transmitted, such as vertical and horizontal synchronization information, as examples.

FIG. 3 illustrates the prior art where a TMDS link for the "0" channel transmits a control character 304 during the inactive/blank time period between times t1 and t2. As explained previously, however, this control character 304 is not DC balanced, which results in receiver errors at the display device 112.

FIG. 4 illustrates an example of signaling according to the present disclosure where at least one rebalancing control character 406 is inserted by the logic 120 along with at least one control character 404 transmitting pertinent control data to the receiver display device 112. The example of FIG. 4 shows multiple control characters each being followed by a corresponding rebalancing control character 406. Each of the rebalancing control characters is constructed such that the total number of 1's for the two associated characters (a control character 404 and a rebalancing control character 406) and the total number of 0's for the two associated characters is the same for DC balancing. As discussed above, the rebalancing control characters are undefined where the series of 1's and 0's in the rebalancing control characters have no meaningful sequence and are disregarded by the receiver in display device 112. It should also be noted that a rebalancing control character 406 may comprise no data (i.e., no 1's and no 0's) if its associated preceded control character 404 happens to be DC balanced. In such a situation, a control character 404 would be immediately followed by a further control character 404. As will be further appreciated, alternative embodiments could organize the control and rebalancing control characters in a different manner provided the signals transmitted between times t1 (202) and t2 (204) are DC balanced. For example, a rebalancing control character 406 could precede its associated control character 404. Additionally, several control characters 404 could be followed or preceded by a single rebalancing control character 406 that DC balances the combination of the associated several control characters 404. As a further example, all control characters 404 could be transmitted prior to or after each of their associated rebalancing control characters 406. Other embodiments and orders are also possible.

Figure 5:
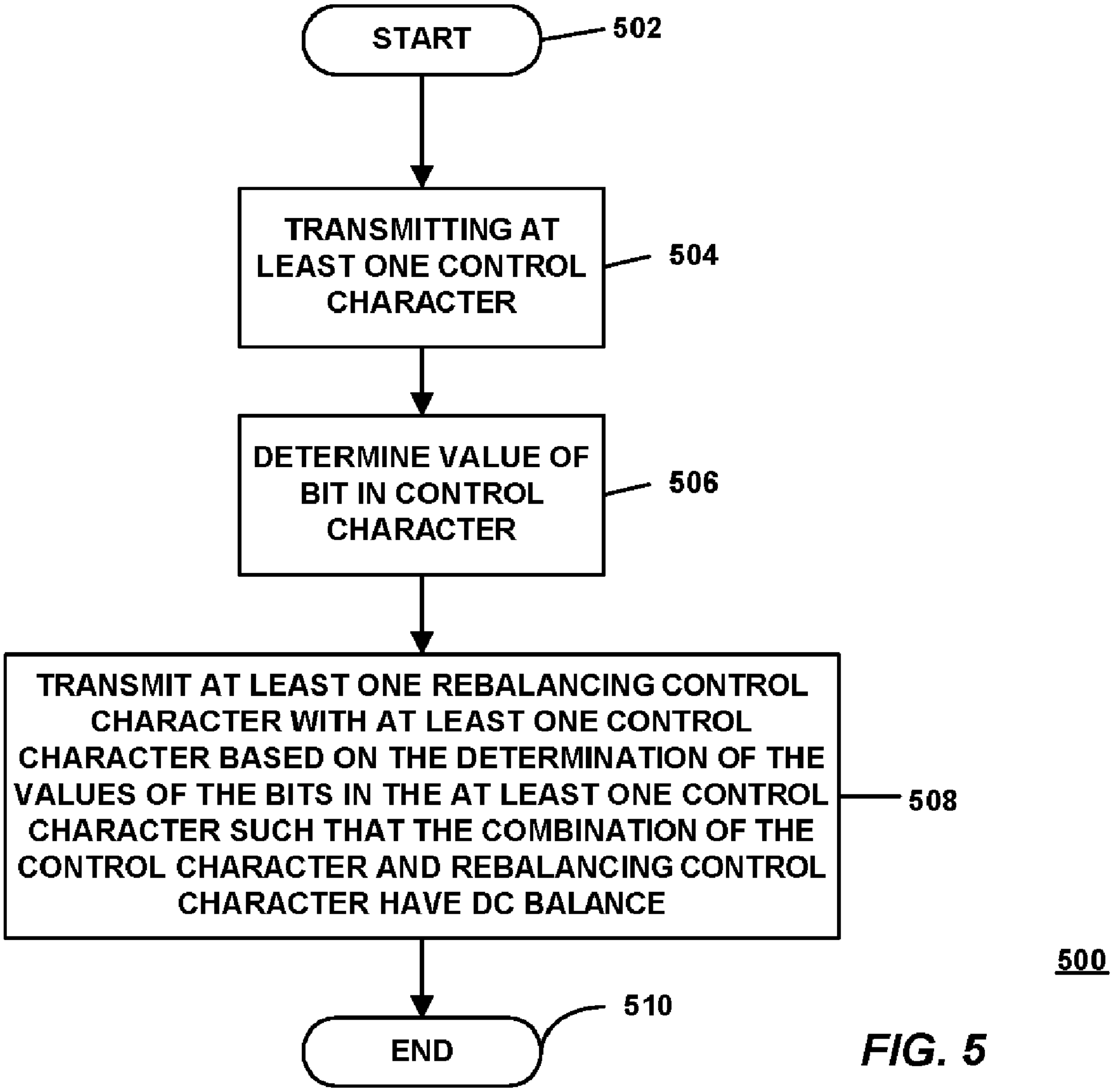
FIG. 5 illustrates an example of a method for driving a display device in accordance with the present disclosure.

FIG. 5 illustrates an exemplary method according to the present disclosure. As illustrated, a flow diagram 500 starts at block 502 and proceeds to block 504 where at least one control character, such as control character 404 is transmitted over the AC coupled interface 118 by a transmitter 110 to the display device 112. The flow then proceeds to block 506 where a value of the bits in the control character are determined by the PCI express logic 120. The flow then proceeds to block 508 where the PCI express logic 120 causes transmission of at least one rebalancing control character, such as rebalancing control character 406, which has been constructed and based on the determination of the values of the bits in the at least one control character such that the combination of the control character and the rebalancing control character have DC balance. This transmission is then received by display 112 via interface 118 The flow then proceeds to block 510 where the process ends before the data enable swings high to an active video region. It is noted that the process 500 of FIG. 5 may be repeated multiple times during an inactive/blank region dependent on how many control and rebalancing control characters are transmitted during the time period or may occur once per inactive/blank region time period in the case where only one control character and one rebalancing control character are transmitted.

It is noted that the presently disclosed apparatus and methods, however, may be utilized in a discrete graphics processing circuit, or any other circuit, chip or device or a device having a slot for coupling a monitor to a graphics processor or other suitable circuit or chip. Among other advantages, the transmitter DC balance correction to non-DC balanced control characters in such a way as to allow DVI and HDMI to operate properly on an AC-coupled connection.

The above-detailed description of the examples has been presented for the purposes of illustration and description only and not by limitation. It is therefore contemplated that the present application cover any additional modifications, variations or equivalents that fall within the spirit and scope of the basic underlying principles disclosed above and in the appended claims.

What is claimed is:

1. A transmitter for transmitting control characters to a display device via an interface comprising:

a transmitter portion configured to transmit at least one control character having a plurality of bit values and at least one separate rebalancing control character to the display device, the at least one control character representing inactive video information; and logic configured to determine values of the bits in the control character and construct the at least one rebalancing control character based on the determination of the values of the bits in the control character, the at least one rebalancing control character constructed to have bit values selected such that the combination of the control character and the rebalancing control character are DC balanced.

2. The transmitter as defined in claim 1, wherein the interface is an AC-coupled interface.

3. The transmitter as defined in claim 1, wherein the interface is an interface operating according to the PCI Express standard.

4. The transmitter as defined in claim 1, wherein the logic is further configured to select the bits of rebalancing control characters such that the total number of zero value and one value bits are equal in the aggregate of the control character and the rebalancing control character to achieve the DC balancing over the interface.

5. The transmitter as defined in claim 1, wherein the at least one control character is at least a portion of vertical and horizontal synchronization information and the at least rebalancing control character are transmitted during a time interval when active display data is not transmitted to the display device.

6. The transmitter as defined in claim 1, wherein the transmitter is configured to include at least the transmitter portion in a coupling device configured to couple with a PCI Express coupling.

7. The transmitter of claim 1 wherein the transmitter transmits several control characters and one rebalancing control character associated with the several control characters.

8. The transmitter of claim 1 wherein the rebalancing control character precedes or follows a control character.

9. Bridge circuitry comprising:

integrated graphics circuitry; and an interface configured to receive a coupling having a transmitter portion for transmitting control characters to a display device via the interface, where the transmitter portion is configured to transmit at least one control character having a plurality of bit values and at least one separate rebalancing control character to the display device, the at least one control character representing inactive video information; and logic configured to determine values of the bits in the control character and construct the at least one rebalancing control character based on the determination of the values of the bits in the control character, the at least one rebalancing control character constructed to have bit values selected such that the combination of the control character and the rebalancing control character are DC balanced.

10. The bridge circuitry as defined in claim 9, wherein the interface is an AC-coupled interface.

11. The bridge circuitry as defined in claim 9, wherein the interface is an interface operating according to the PCI Express standard.

12. The bridge circuitry as defined in claim 9, wherein the logic is configured to select the bits of the rebalancing control characters such that the total number of zero value and one value bits are equal in the aggregate of the control character and the rebalancing control character to achieve the DC balancing over the interface.

13. The bridge circuitry as defined in claim 9, wherein the at least one control character is at least a portion of vertical and horizontal synchronization information and the at least rebalancing control character are transmitted during a time interval when active display data is not transmitted to the display device.

14. The bridge circuitry as defined in claim 9, wherein the bridge circuitry is a northbridge and wherein the interface includes a PCI Express coupling and the coupling device is configured to include at least a transmitter portion in a coupling device configured to couple with the PCI Express coupling.

15. A method for transmitting control characters for driving a display device over an interface comprising:

transmitting at least one control character to a display device;

determining the values of the bits in the at least one control character; and transmitting at least one separate rebalancing control character with the at least one control character, the rebalancing control character constructed based on the determination of the values of the bits in the at least one control character such that the combination of the at least one control character and the at least one rebalancing control character have DC balance, the at least one control character representing inactive video information.

16. The method as defined in claim 15, wherein the interface is an AC-coupled interface.

17. The method as defined in claim 15, wherein the interface is an interface operating according to the PCI Express standard.

18. The method as defined in claim 15, comprising selecting the bits of rebalancing control characters such that the total number of zero value and one value bits are equal in the aggregate of the control character and the rebalancing control character to achieve the DC balancing over the interface.

19. The method as defined in claim 15, wherein the at least one control character is at least a portion of vertical and horizontal synchronization information and the at least rebalancing control character are transmitted during a time interval when active display data is not transmitted to the display device.

20. The method as defined in claim 15, wherein the transmitter is configured to include at least the transmitter portion in a coupling device configured to couple with a PCI Express coupling.

* * * * *